United States Patent
Stojkovic

(10) Patent No.: US 9,415,744 B1
(45) Date of Patent: Aug. 16, 2016

(54) FRANGIBLE MEMBER FOR VEHICLE BODY STRUCTURE

(71) Applicant: Ford Global Technologies, LLC, Dearborn, MI (US)

(72) Inventor: Dragan B. Stojkovic, Taylor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/883,134

(22) Filed: Oct. 14, 2015

(51) Int. Cl.
*B60R 21/34* (2011.01)
*B62D 21/15* (2006.01)
*B62D 25/08* (2006.01)
*B62D 25/16* (2006.01)

(52) U.S. Cl.
CPC .............. *B60R 21/34* (2013.01); *B62D 21/152* (2013.01); *B62D 25/081* (2013.01); *B62D 25/163* (2013.01)

(58) Field of Classification Search
CPC ..... B62D 25/081; B62D 25/163; B60J 1/006; B60R 21/34
USPC ............... 296/192, 198, 187.04, 96.22, 96.21
See application file for complete search history.

(56) References Cited

U.S. PATENT DOCUMENTS

| | | | |
|---|---|---|---|
| 7,316,448 B2 | 1/2008 | Koyama et al. | |
| 7,614,688 B2 * | 11/2009 | Noel | B60R 21/34 296/187.04 |
| 8,002,335 B2 | 8/2011 | Usuda | |
| 8,016,347 B2 * | 9/2011 | Uchino | B60R 21/34 180/69.21 |
| 9,193,390 B1 * | 11/2015 | Yoshida | B62D 25/081 |
| 2002/0060474 A1 * | 5/2002 | Chung | B60R 21/34 296/187.04 |
| 2003/0052517 A1 * | 3/2003 | Nakata | B60R 21/34 296/203.2 |
| 2004/0007901 A1 * | 1/2004 | Weik | B62D 25/082 296/198 |
| 2008/0100073 A1 * | 5/2008 | Mitsuyama | B62D 25/163 293/132 |
| 2011/0068607 A1 * | 3/2011 | Ott | B60R 21/34 296/192 |
| 2012/0043786 A1 * | 2/2012 | Challal | B60R 21/34 296/203.02 |
| 2015/0197285 A1 * | 7/2015 | Hayakawa | B62D 25/081 296/192 |

FOREIGN PATENT DOCUMENTS

| | | | |
|---|---|---|---|
| EP | 1568578 A1 | | 8/2005 |
| EP | 1800998 A1 | | 6/2007 |
| JP | 2005329874 A | * | 12/2005 |
| JP | 4366099 B2 | | 11/2009 |
| JP | 2010083326 A | | 4/2010 |
| JP | 4650202 B2 | | 3/2011 |

OTHER PUBLICATIONS

Machine translation of JP2005329874-A, printed from the JPO website, May 23, 2016.*

* cited by examiner

*Primary Examiner* — Jason S Morrow
(74) *Attorney, Agent, or Firm* — Jason C. Rogers; Brooks Kushman P.C.

(57) ABSTRACT

A vehicle body structure includes a cowl top and a cowl inner. A bracket assembly is connected between the cowl top and the cowl inner, and includes a frangible member having a fracture portion. The fraction portion has a reduced cross-sectional area, and is configured to shear in response to a drive-cycle impact to the cowl top.

18 Claims, 4 Drawing Sheets

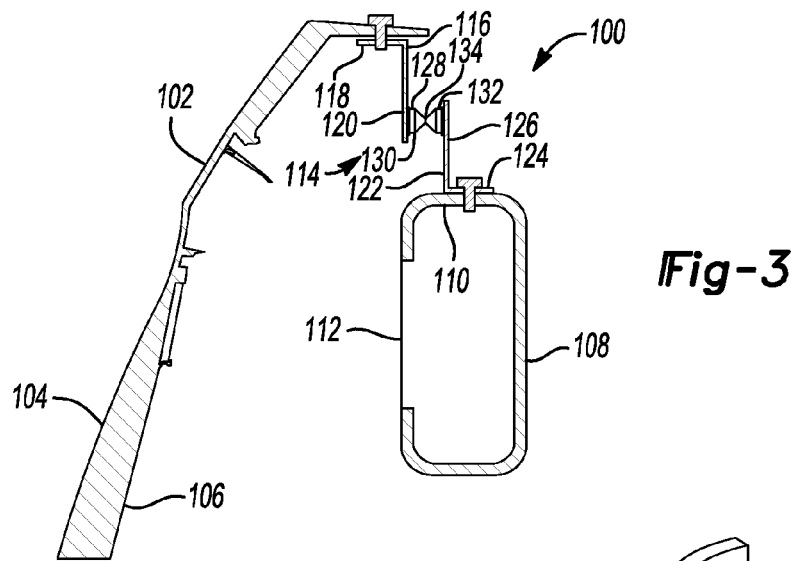
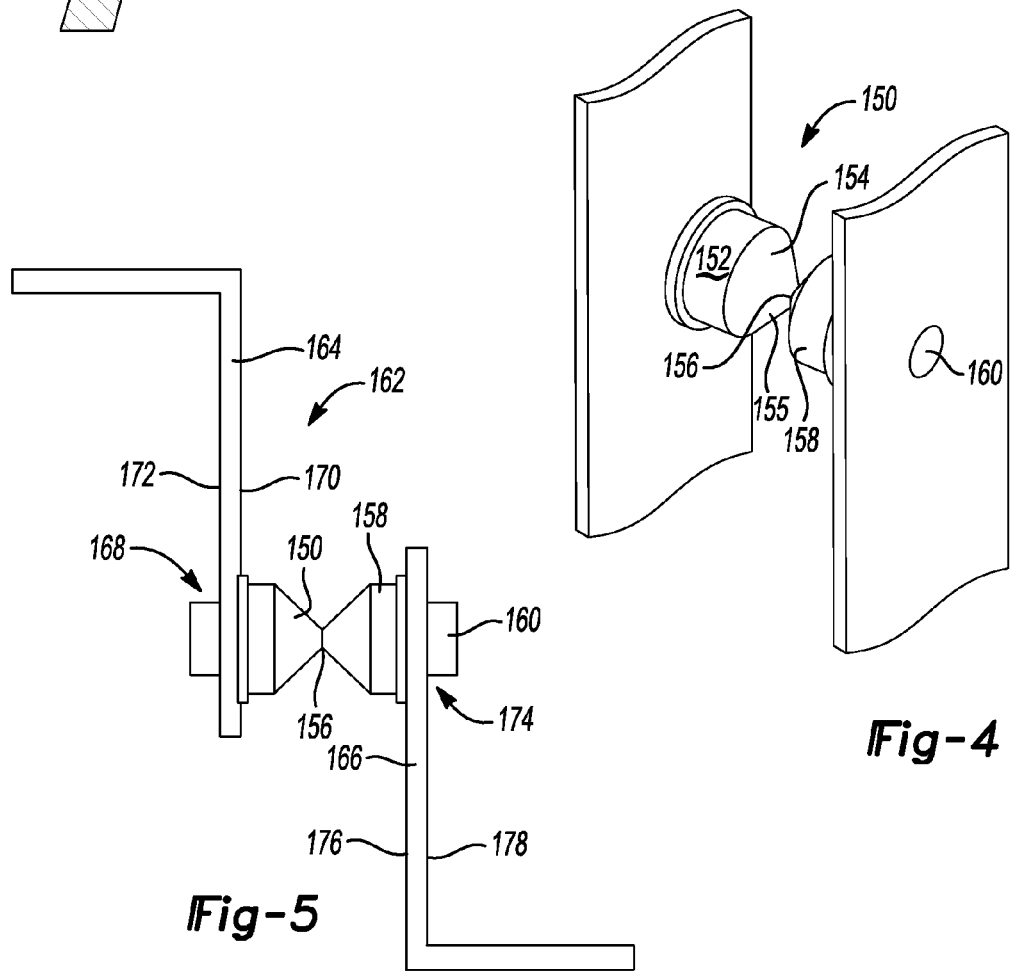

FRANGIBLE MEMBER FOR VEHICLE BODY STRUCTURE

TECHNICAL FIELD

The present disclosure relates to vehicle body structures and specifically to a frangible member configured to fracture in response to a drive-cycle impact.

BACKGROUND

Motor vehicles experience many drive cycles where the vehicle is operated on roads and within government regulations. During these drive cycles, a drive-cycle impact may occur when the vehicle collides with other vehicles or objects. During these collisions, an object may impact the cowl top near the base of the windshield. Prior-art solutions that reduce cowl-top impacts include cowl air bags that deploy over the windshield during a collision. Cowl air bags may be expensive, difficult to service, and constrain styling flexibility.

SUMMARY

According to one embodiment, a vehicle body structure includes a cowl top and a cowl inner. A bracket assembly is connected between the cowl top and the cowl inner, and includes a frangible member having a fracture portion. The fraction portion has a reduced cross-sectional area, and is configured to shear in response to a drive-cycle impact to the cowl top.

According to another embodiment, a vehicle body structure includes a front end structure and a fender. A bracket assembly is connected between the front end structure and the fender. The bracket assembly includes a frangible member configured to shear in response to a drive-cycle impact to the fender.

According to yet another embodiment, a bracket assembly for a vehicle includes a first bracket connectable to a cowl top of the vehicle, a second bracket connectable to a cowl inner of the vehicle, and a frangible member. The frangible member is connected between the first and second brackets and is configured to shear in response to a drive-cycle impact to the cowl top.

BRIEF DESCRIPTION OF THE DRAWINGS

FIG. 3 is front view, in cross section, of another vehicle body structure.

FIG. 4 is a perspective view of a frangible member according to one embodiment.

FIG. 5 is a side view of a bracket assembly including the frangible member of FIG. 4.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
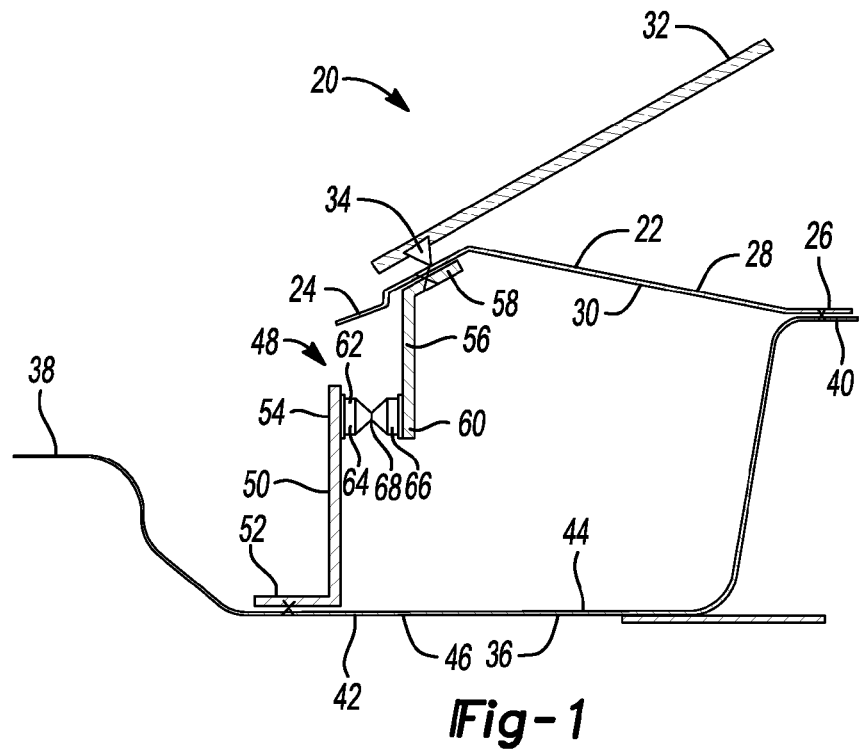
FIG. 1 is a side view, in cross section, of a vehicle body structure.

Referring to FIG. 1, a vehicle body structure 20 includes a cowl top 22 having a forward portion 24, a rear portion 26, an upper side 28, and a lower side 30. A cowl top is a body panel (typically metal) that extends cross-wise from one longitudinal side of the vehicle towards the other. The cowl top is typically positioned near the base of the windshield, and is adjacent to a rear portion of the hood and a front portion of the dash panel. In some embodiments, the cowl top 22 is welded or fastened to the dash panel. In the illustrated embodiment, a windshield 32 is attached to the upper side 28 of the cowl top near the forward portion 24. The windshield 32 may be attached with adhesive 34. The body structure 20 also includes a cowl inner 36 having a forward portion 38, a rear portion 40, a tub 42, an upper side 44, and a lower side 46. The rear portion of the cowl top 22 is joined with the rear portion of the cowl inner 36. Depending upon the materials, the cowl top and cowl inner may be joined via welding, riveting, fasteners, or adhesive. The cowl inner 36 is a body structure (typically metal) that generally extends cross-wise from one longitudinal side of the vehicle towards the other. In some embodiments, the cowl inner is connected to the driver-side cowl side on one end and is connected to the passenger-side cowl side on the other end. The cowl inner may also be connected to the dash panel.

The forward portion 24 of the cowl top 22 may be supported by a bracket assembly 48 that connects between the cowl top 22 and the cowl inner 36. The assembly 48 may include a first bracket 50 having a flange 52 that is joined with the upper side 44 of the cowl inner 36. The assembly 48 also includes a second bracket 56 having a flange 58 that is joined to the lower side 30 of the cowl top 22. The second bracket 56 may be joined to the cowl top 22 near the window adhesive 34. A frangible member 62 connects between the brackets. The frangible member 62 includes a first end 64 connected to the distal end 54 of the first bracket 50, and a second end 66 connected to the distal end 60 of the second bracket 56. The frangible member 62 has a fracture portion 68 that is configured to shear in response to a drive-cycle impact to the cowl top. A drive-cycle impact is an impact that occurs during a normal drive cycle of the vehicle. An example drive-cycle impact would be an object impacting a cowl top of the vehicle when the vehicle is traveling on a public road. The fracture portion 68 may be in the form of a reduced cross-sectional area, which has a lower shear strength than the main portion of the member 62. One or more bracket assemblies 48 may be used to support the cowl top 22.

Figure 2:
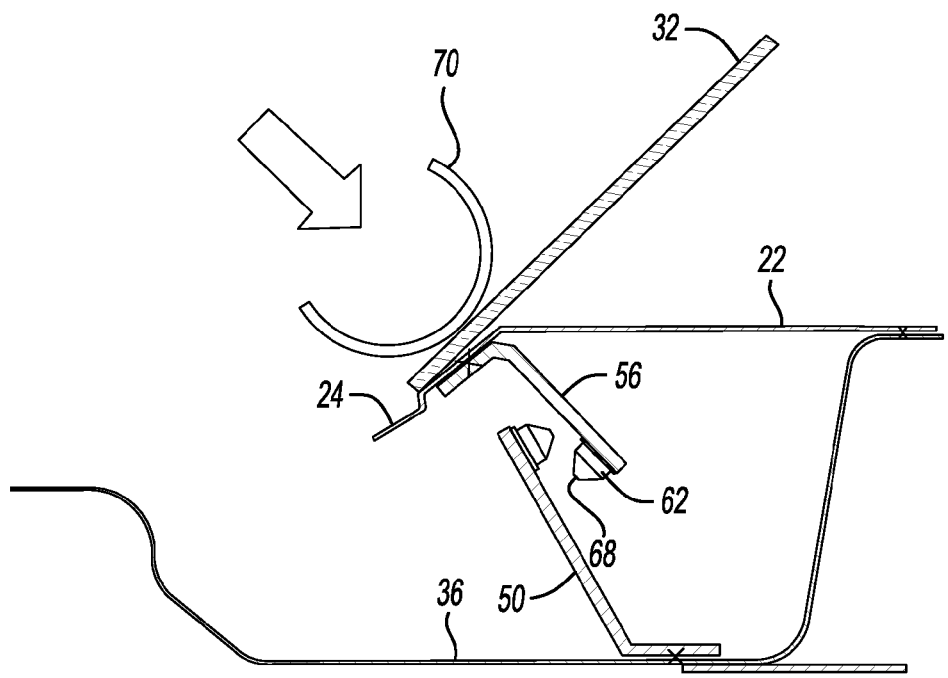
FIG. 2 is a side view, in cross section, of the vehicle body structure after a collision.

Referring to FIG. 2, during a collision, an object 70 may impact the windshield 32 near the cowl top 22. The force from the drive-cycle impact may be sufficient to shear the frangible member 62 at portion 68 placing the frangible member 62 in the sheared condition. Once the frangible member 62 shears, the cowl top 22 may deflect downwardly towards the cowl inner 36 during the drive-cycle impact. This reduces the deceleration of the object 70 as the object impacts the cowl top 22 creating a softer impact.

The fracture portion 68 of the frangible member 62 can be tuned by increasing or decreasing the cross-sectional area to achieve the desired shear strength. The shape of the frangible member 62 and the location of the fracture portion 68 may also be modified to achieve this purpose. The desired shear strength is a balance between reducing impact during a collision and providing serviceable performance during normal operation of the vehicle. The cowl top 22 supports the lower portion of the windshield 32 and must have sufficient strength to prevent the windshield from excessively deflecting in response to wind loads, and forces experienced during driving (e.g. bumps, braking, corning, etc.) The loads experience by the cowl top 22 are generally static loads, as compared to an impact event, which is a dynamic load. The frangible member 62 is designed to remain intact and support the static loads, and is designed to shear during dynamic loading—such as during a drive-cycle impact event.

Referring to FIG. 3, another vehicle body structure 100 includes a fender 102 having an exterior surface 104 and an interior surface 106, and a front-end structure 108 having a top 110 and sidewalls 112. The front-end structure 108 may be a frame rail, a shotgun tube, or any other structural support member. A bracket assembly 114 may be connected between the fender 102 and the front end structure 108. The bracket assembly 114 supports the fender 102 and holds the fender in proper position. One or more bracket assemblies 114 may be used to support the fender 102.

In the illustrated example, the bracket assembly 114 includes a first bracket 116 having a flange 118 joined with an interior surface 106 of the fender 102, and a second bracket 122 having a flange 124 that is joined with the front end structure 108. The second bracket 122 may be connected to the front end structure at the top 110 (as illustrated), or at the sidewall 112. The frangible member 128 includes a first end 130 is connected with the first bracket 116, and a second end 132 that is connected to the second bracket 122. The frangible member 128 also includes a fracture portion 134 that is similar to the fraction portion 68 of the frangible member 62 described above.

FIG. 4 illustrates an example embodiment 150 of the frangible members. The frangible member 150 includes a body 152 that defines an hourglass shape. The body 152 also defines a notch 154. The notch 154 may be V-shaped notch having angled walls 155 that meets at a vertex. The angled walls 155 each extends from a shoulder portion 158 of the frangible member 150 to the vertex. The notch 154 forms the fracture portion 156. The fraction portion has a reduced cross-sectional area compared to the main portion of the body 152. Thus, the frangible member 150 is designed to shear at the fracture portion 156. The sheer strength of the frangible member 150 can be tuned by altering the notch 154. For example, decreasing the size or depth of the notch 154 increases the strength of the frangible member 150, and increasing the size or depth of the notch 154 reduces the strength of the frangible member 150. The frangible member 150 may also include extensions 160 that each extend outwardly from a corresponding shoulder portion 158. The frangible member 150 may be made of metal, plastic, composite, or other suitable material. In some embodiments, the frangible member is steel, aluminum, titanium, nylon, or ceramic.

FIG. 5 illustrates an example bracket assembly 162 having the frangible member 150. The bracket assembly 162 includes a first bracket 164, and a second bracket 166. The first bracket 164 defines a hole 168 extending between a front side 170 and the backside 172. The second bracket 166 defines a hole 174 that extends between the front side 176 and the backside 178. The frangible member 150 connects between the brackets 164, 166. One end of the frangible member 150 is connected to the first bracket 164 such that the extension 160 extends through the hole 168, and the other end of the frangible member 150 is connected to the second bracket 166 such that the extension 160 extends through the hole 174. The frangible member 150 may be joined to the brackets by welding the extensions to the backside of the brackets. Alternatively, the extensions 160 may be mushroomed to create a rivet-type connection between the brackets and the frangible member 150. In another embodiment, the frangible member 150 may be joined with the brackets via adhesive, or other means.

Figure 6:
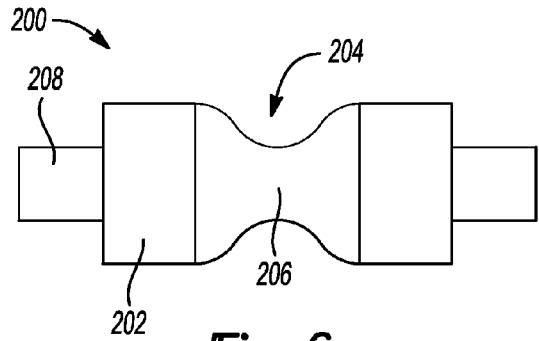
FIGS. 6 through 12 illustrate other example embodiments of the frangible member.

FIGS. 6 through 12 illustrate alternative embodiments of the frangible member. The frangible members illustrated in FIGS. 6 through 12 may be metal, composite, nylon or plastic. Referring to FIG. 6, a frangible member 200 includes shoulder portions 202 and a notch 204. The notch 204 is similar to the notch 154 of the frangible member 150, except that, the notch 204 is a U-shaped notch as opposed to a V-shaped notch. The notch defines a fracture portion 206. The frangible member 200 may also include extensions 208 that are received within brackets as described above.

Figure 7:
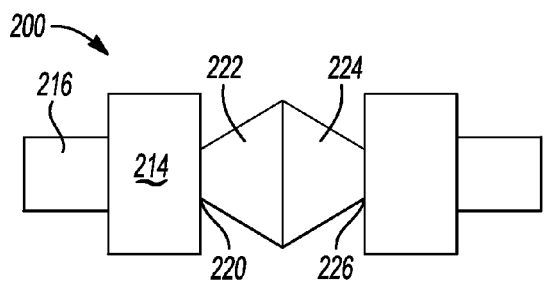

Referring to FIG. 7, a frangible member 212 includes shoulder portions 214 and extensions 216 extending outwardly therefrom. The extensions extend through the brackets to attach the frangible member 212 to the brackets. The frangible member 212 includes a first frustoconical section 222 and a second frustoconical section 224. The frustoconical sections are disposed between the shoulder portions 214. The first frustoconical section 222 defines a first fracture portion 220 where the frustoconical section intersects with one of the shoulder portions 214. The second frustoconical section 224 defines a second fracture portion 226 where the section 224 intersects with the other of the shoulders 214.

Figure 8:
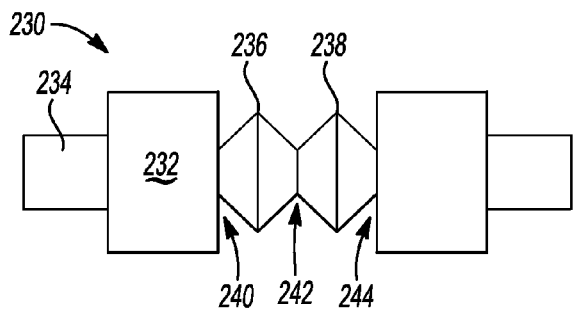

Referring to FIG. 8, a frangible member 230 includes shoulder portions 232 that each have an extension 234 extending therefrom. Disposed between the shoulder portions 332 are a first section 236 and a second section 238. The frangible member 230 includes a first fracture portion 240, a second fracture portion 242, and a third fracture portion 244.

Figure 9:
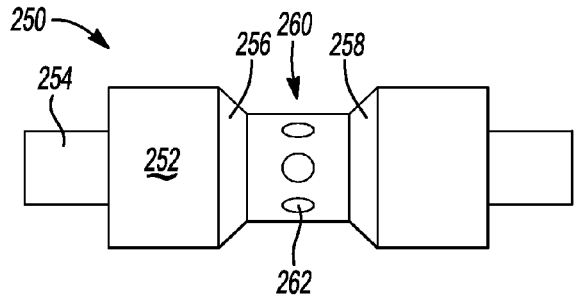

Referring to FIG. 9, a frangible member 250 includes shoulder portions 252 each having an extension 254 extending therefrom. First and second frustoconical sections 256, 258 are disposed between the shoulder portions. A slender portion 260, that may be cylindrical, extends between the first and second frustoconical sections 256, 258. The slender portion 260 may define one or more apertures 262. The apertures weaken the slender portion 260 creating a fracture area where the frangible member 250 will shear during a collision event of sufficient magnitude.

Figure 10:
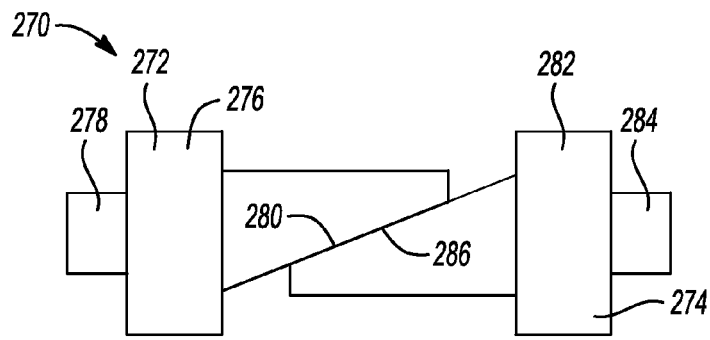

Referring to FIG. 10, a frangible member 270 includes a first component 272 and a second component 274. The first component 272 includes a shoulder portion 276 having an extension 278. The first component 272 also includes a first angled surface 280. The second component 274 includes a shoulder portion 282 having an extension 284. A second angled surface 286 of the second component 274 is disposed against the first angled surface 280. The frangible member 270 includes a fracture line along the interface between the first and second angled surfaces. The angled surfaces may be joined together via welding, soldering, adhesive, or by magnetic force. During an impact event of sufficient magnitude, the impact forces cause the first component 272 separate from the second component 274 to reduce impact force on an object.

Figure 11:
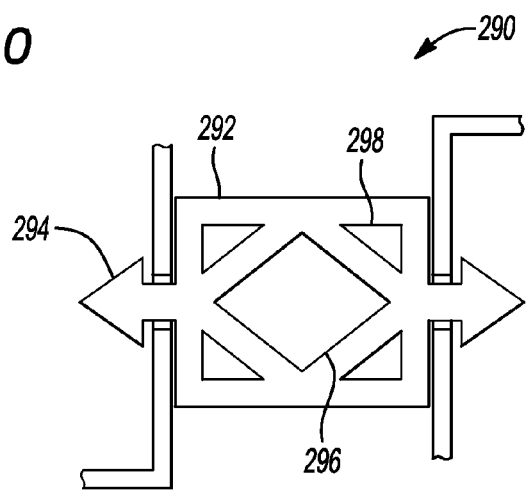

Referring to FIG. 11, a frangible member 290 includes a main body 292 and a pair of extensions 294 that each connect with one of the brackets. The extensions 294 may include arrowheads allowing the extensions to be easily pushed through an aperture in the brackets and resist movement in the pullout direction. The main body 292 may define a plurality of apertures. For example the main body 292 may define a center aperture 296 and a plurality of peripheral apertures 298. The size, shape, and the arrangement of the apertures can be modified to tune the stiffness of the body 292. The frangible member 290 may be designed to shear at the extensions 294 or at one of more of the apertures. The frangible member 290 may be also be designed to flex without shearing. This has the advantage of not requiring replacement.

Figure 12:
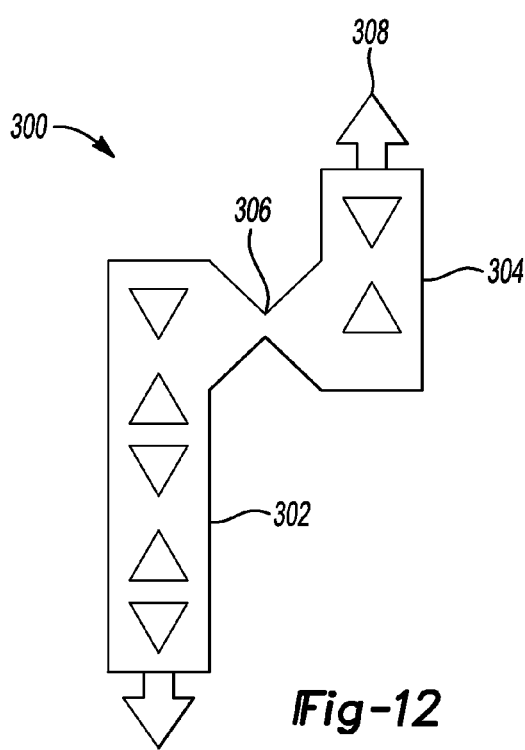

Referring to FIG. 12, a frangible member 300 includes a first segment 302 and a second segment 304 that are joined together at a fracture portion 306. Each of the first and second segments includes an extension 308 for attaching the segments to the brackets. The fracture portion 306 is a smaller cross-sectional area than the segments and is designed to shear during an impact event of sufficient magnitude. The frangible member 300 may be integrally formed as a single piece.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle body structure comprising:
a cowl top;
a cowl inner welded to the cowl top; and
a plurality of bracket assemblies, each including:
a first bracket connected to the cowl top,
a second bracket connected to the cowl inner, and
a frangible member having a first end connected to the first bracket and a second end connected to the second bracket such that the frangible member extends perpendicularly from the second bracket, wherein the frangible member further includes a fracture portion having a reduced cross-sectional area configured to shear in response to a drive-cycle impact to the cowl top.

2. The vehicle body structure of claim 1 further comprising a windshield attached to the cowl top.

3. The vehicle body structure of claim 1 wherein the frangible member further includes a body defining an hourglass shape.

4. The vehicle body structure of claim 1 wherein the frangible member further includes a first projection disposed in a hole defined in the first bracket and a second projection disposed in a hole defined in the second bracket.

5. The vehicle body structure of claim 1 wherein the frangible member includes a notch that defines the fracture portion.

6. The vehicle body structure of claim 1 wherein the first bracket includes a first longitudinal axis that is substantially parallel to a second longitudinal axis of the second bracket, and wherein the first and second brackets are spaced apart from each other in a direction perpendicular to the first and second axes.

7. A vehicle body structure comprising:
a front end structure;
a fender; and
a plurality of bracket assemblies each including a first bracket connected to the front end structure, a second bracket connected to the fender, and a frangible member connected between the first and second brackets such that the frangible member extends perpendicularly from one of the brackets, wherein the frangible member is configured to shear in response to a drive-cycle impact to the fender.

8. The vehicle body structure of claim 7 wherein the frangible member further includes a body defining an hourglass shape.

9. The vehicle body structure of claim 7 wherein the frangible member further includes a fracture portion having a reduced cross-sectional area.

10. The vehicle body structure of claim 8 wherein the frangible member further includes a first projection disposed in a hole defined in the first bracket and a second projection disposed in a hole defined in the second bracket.

11. A bracket assembly for a vehicle comprising:
a first bracket connectable to a cowl top of the vehicle;
a second bracket connectable to a cowl inner of the vehicle; and
a frangible member including a first projection received in the first bracket and a second projection received in the second bracket and configured to shear in response to a drive-cycle impact to the cowl top.

12. The assembly of claim 11 wherein the frangible member further includes a body defining an hourglass shape.

13. The assembly of claim 11 wherein the frangible member further includes a fracture portion having a reduced cross-sectional area.

14. The assembly of claim 13 wherein the frangible member further includes a notch that defines the fracture portion.

15. The assembly of claim 11 wherein the frangible member is welded to the first and second brackets.

16. The assembly of claim 11 wherein the frangible member is fastened to the first and second brackets.

17. The assembly of claim 11 wherein the first bracket includes a first longitudinal axis that is substantially parallel to a second longitudinal axis of the second bracket, and wherein the first and second brackets are spaced apart from each other in a direction perpendicular to the first and second axis.

18. The assembly of claim 11 wherein the first bracket defines a hole and the first projection is disposed in the hole.

* * * * *